3,308,099
PRODUCTION OF POLYLACTAMS
Charles Mermoud, Lyon, and Jean Abeille, St-Rambert
L'Ile Barbe, France, assignors to Societe Rhodiaceta,
Paris, France, a French body corporate
No Drawing. Filed Mar. 21, 1963, Ser. No. 266,826
Claims priority, application France, Mar. 29, 1962,
892,711
10 Claims. (Cl. 260—78)

This invention relates to the production of synthetic linear polyamides by the anionic polymerisation of lactams, and more especially to such polymerisation when carried out at a temperature below the melting point of the polyamide product.

The reactions involved in the production of synthetic linear polyamides by anionic polymerisation of lactams have a very high velocity when the operation takes place above the melting point of the polyamide in question. In such a process, the catalysts normally employed are organomagnesium complexes or alkali or alkaline earth metals or derivatives thereof, such as the oxides, hydroxides, or carbonates.

When working below the melting point of the polyamide using only the catalysts described above, the overall reaction is very slow and quite impracticable. However, it is often very desirable to be able to carry out the lactam polymerisation at such temperatures, one notable advantage of this technique being that it makes it possible for shaped elements to be directly obtained without having to use conventional moulding methods, such as injection or extrusion of the polyamides in the molten state.

In order to accelerate the rate of reaction at these relatively low temperatures, various compounds, generally known as co-catalysts, have been proposed, which, when added to the reaction mixture, permit the polyamide to be obtained in a comparatively short time and at a rate which is satisfactory for commercial operation.

Among the compounds that have been proposed as co-catalysts are those containing the active group:

wherein A and B represent

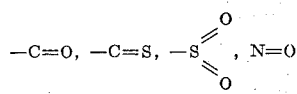

e.g. N-acetyl caprolactam and also compounds capable of forming such derivatives by reaction with the lactam, such as, for example, as acetyl chloride, acetic anhydride, and carbon dioxide gas.

Other compounds that have been proposed as cocatalysts include derivatives of a mineral or organic acid, such as the esters, amides or nitriles, for example triphenyl phosphate or butyl stearate; and urea, thiourea and guanidine derivatives.

According to the present invention there is provided a process for the preparation of synthetic linear polyamides by anionic polymerisation of lactams, wherein the polymerisation is effected in the presence of, as cocatalyst, a linear polyether of the general formula:

wherein X represents hydroxyl or an organic radical of valency $p$; each R represents a hydrocarbon radical, which may be the same or different throughout the molecule; Y is hydrogen or a group inert to the polymerisation reaction; $n$ is an integer equal to or greater than 2; and $p$ is a positive integer.

Examples of suitable cocatalysts are: triethylene glycol, polyethylene oxides, $HO[(CH_2)_2O]_nH$, polypropylene oxides, $HO[CH(CH_3)CH_2O]_nH$, polytetramethylene oxides, $HO[(CH_2)_4O]_nH$, the condensation products of ethylene oxide with lauric alcohol, $$CH_3(CH_2)_{11}O(CH_2CH_2O)_nH$$

lauric acid, $CH_3(CH_2)_{10}COO(CH_2CH_2O)_nH$, p-toluene sulphonamide, 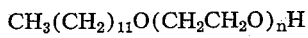, or polypropylene oxides of formula:

wherein $a$, $b$, and $c$ represent positive integers.

The present process is applicable to all lactams which easily yield linear polyamides by anionic polymerisation, that is to say, in practice it is applicable to those which contain at least 5 carbon atoms in their ring, and more especially ω-caprolactam, capryllactam and dodecanolactam. The lactams can be used separately or in admixture, particularly with N-substituted lactams, so as to form copolyamides.

The catalyst generally used is sodium, potassium or an organomagnesium complex, and is preferably present in an amount between 0.1% and 3% by weight of the lactam, the precise amount depending on the nature of the lactam, the nature of the said catalyst and the viscosity desired for the polyamide.

In order that the new co-catalysts may achieve their maximum efficiency, it is preferred that they should be soluble at the polymerisation temperature in the reaction mixture formed by the lactam and the catalyst. The quantities used generally vary from 0.1 to 5% by weight, based on the lactam.

The reaction is preferably carried out in an inert atmosphere in order to avoid oxidation of the polyamide which is formed.

The polymerisation temperature is normally between 130° C. and the melting point of the polyamide, and more especially between 150° C. and the melting point of the polyamide. It will be appreciated that the co-catalysts of the present invention possess their greatest utility when the reaction is carried out below the melting point of the polyamide product, since conventional catalysts alone produce satisfactory results above this temperature.

The duration of the polymerisation reaction may be varied according to the characteristics required in the final polyamide, and is generally between 4 and 12 hours. However, when the polyamide product is to be produced as large lumps, the duration of the reaction is often in excess of 12 hours.

The viscosity of the resulting polyamides may be controlled by varying one or more of the following conditions: proportion of catalyst, and the time and temperature of the polymerisation. By these means very high intrinsic viscosities may be obtained.

Irrespective of the working conditions, the polymerisation yield is very good: for example, with caprolactam, it always exceeds 90%.

The mechanical properties of the polyamide products are similar to those manufactured with the cocatalysts previously used, particularly the breaking resistance, and the resistance to shock and abrasion. Moreover, the present process has one particularly important advantage over those previously used; namely that its products are substantially colourless, particularly when triethylene glycol is used as cocatalyst, whereas the processes employed hitherto yield products having a yellowish colour.

If it is desired, any suitable auxiliary agent such as fillers, pigments and plasticisers, can be added to the reaction products.

Example I 4 parts of triethylene glycol are added to 400 parts of ε-caprolactam. This mixture is melted and when the temperature is in the region of 80° C., 1 part of sodium is added. The mixture is homogenised by stirring and the temperature is raised to 180° C. An increase in the apparent viscosity of the composition is observed at the end of 1 hour 20 minutes, and after heating for 2½ hours, the composition is completely opaque. The product obtained after 4 hours at 180° C. has an inherent viscosity in m-cresol of 0.65 and melting point 217° C.

Example II 4 parts of triethylene glycol are added to 400 parts of ε-caprolactam. This mixture is melted and when the temperature is in the region of 80° C., 1.7 parts of potassium (equivalent to 1 part of sodium) are added. The mixture is homogenised by stirring and the temperature is raised to 180° C. A marked increase in viscosity is observed after heating for 50 minutes, and in 2½ hours, an opaque mass is obtained. The product obtained after 4 hours at 180° C. has an inherent viscosity in m-cresol of 0.72 and melting point 217° C.

Example III 2 parts of polyethylene oxide molecular weight 280 to 310 (polyglycol 300 H of Naphtachimie) are added to 200 parts of ε-caprolactam. This mixture is melted and, when the temperature is in the region of 80° C., 1 part of sodium is added. The mixture is homogenised by stirring and the temperature is raised to 180° C. After heating for 2½ hours, the mass is completely opaque. The product obtained after 4 hours at 180° C. has an inherent viscosity in m-cresol of 0.75 and a lactam content of 3.6% and melting point 218° C.

By way of comparison, after 7 hours under the same conditions but without cocatalyst, a polyamide having an inherent viscosity in m-cresol of 0.46 is obtained.

Example IV 2 parts of polyethylene oxide molecular weight 380 to 420 (polyglycol 400 S of Naphtachimie) are added to 200 parts of ε-caprolactam. This mixture is melted and when the temperature is in the region of 80° C., 1 part of sodium is added. The mixture is homogenised by stirring and the temperature is raised to 180° C. After heating 3¼ hours, the mass is completely opaque. The produce obtained after 4 hours has an inherent viscosity in m-cresol of 0.75 and a lactam content of 8.9% and melting point 217° C.

Example V 2 parts of polypropylene oxide molecular weight 975 to 1075 (propylene glycol 1025, Union Carbide) are added to 200 parts of ε-caprolactam. This mixture is melted and when the temperature is in the region of 80° C., 1 part of sodium is added. The mixture is homogenised by stirring and the temperature is raised to 180° C. After heating for 4 hours 25 minutes, the mass is completely opaque. The product obtained after heating for 6 hours has an inherent viscosity in m-cresol of 0.71 and melting point 217° C.

Example VI 4 parts of triethylene glycol are added to 400 parts of ε-caprolactam. This mixture is melted, and when the temperature is in the region of 80° C., 1 part of sodium metal is added. The mixture is homogenised by stirring and the temperature is raised to 160° C. After heating for 10 hours at 160° C., the product obtained has an inherent viscosity in m-cresol of 0.95, a lactam content of 6.3% and melting point 219° C.

By way of comparison, under the same conditions but without cocatalyst, the polymerisation does not occur.

Example VII 2 parts of triethylene glycol are added to 200 parts of ε-caprolactam. This mixture is melted and when the temperature is in the region of 80° C., 1.7 parts of potassium (equivalent to 1 part of sodium) are added. The mixture is homogenised by stirring and the temperature is raised to 160° C. After 1¼ hours, a mass is obtained which rapidly becomes opaque, and after heating for 4 hours, the product obtained has an inherent viscosity in m-cresol of 0.79 and melting point 217° C.

Example VIII 2 parts of triethylene glycol are added to 200 parts of ε-caprolactam. The mixture is melted and when the temperature is in the region of 80° C., 1.7 parts of potassium (equivalent to 1 part of sodium) are added. The mass is homogenised by stirring and the temperature is raised to 150° C. An increase in the viscosity of the mass is observed after 1¼ hours. After heating for 4 hours, a very white product is obtained which has an inherent viscosity in m-cresol of 1.18 and melting point 221° C.

By way of comparison, under the same conditions but without cocatalyst, the polymerisation does not take place.

Example IX 2 parts of triethylene glycol are added to 200 parts of ε-caprolactam. This mixture is melted and when the temperature is in the region of 80° C., 1 part of potassium is added. The mixture is homogenised by stirring and the temperature is maintained at 150° C. for 4 hours. The polyamide obtained is very white and has an inherent viscosity in m-cresol of 1.36 and melting point 222° C.

Example X 4 parts of triethylene glycol are added to 400 parts of ω-capryllactam. This mixture is melted and when the temperature reaches about 120° C., 1 part of sodium is added. The mixture is homogenised by stirring and the reaction mixture is brought to the temperature of 180° C., which is maintained for 6 hours. The polymer obtained has a softening point of 198° C., an inherent viscosity in m-cresol of 0.90.

Example XI 6 parts of a condensation product of ethylene oxide and lauric alcohol (molecular weight approximately 400) are added to 500 parts of ε-caprolactam. This mixture is melted and when the temperature reaches about 80° C., 1 part of sodium is added. This mixture is homogenised by stirring and the temperature raised to 180° C. The product obtained after six hours heating at 180° C., which is polycaprolactam, has an inherent viscosity in m-cresol of 0.90 and melting point 219° C.

We claim:

1. Process for the production of a linear polyamide which comprises heating a lactam of at least 5 carbon atoms under anhydrous conditions at between 130° C. and the melting point of the polyamide product in the presence of an alkaline anionic catalyst together with, as cocatalyst, 0.1 to 5% by weight of the lactam of a linear polyether of formula:

$$X[(RO)_nH]_p$$

where X is hydroxy, lauryl, lauroyl, or N-p-toluene sulphonamide, each R is independently selected from the class consisting of $-CH_2CH_2-$, $-CH(CH_3)CH_2-$, and $-(CH_2)_4-$, $n$ is an integer equal to or greater than 2, and $p$ is 1 or 2.

2. Process according to claim 1 wherein the said cocatalyst is a member selected from the class consisting of triethylene glycol, $HO[(CH_2)_2O]_nH$, $$HO[CH(CH_3)CH_2O]_nH$$

and the condensation products of ethylene oxide with lauric alcohol and lauric acid.

3. Process according to claim 1 wherein the cocatalyst is triethylene glycol.

4. Process according to claim 1 wherein the cocatalyst is $HO[(CH_2)_2O]_nH$.

5. Process according to claim 1 wherein the cocatalyst is $HO[CH(CH_3)CH_2O]_nH$.

6. Process according to claim 1 wherein the cocatalyst is a condensation product of ethylene oxide with a compound selected from the group consisting of lauric alcohol, lauric acid, p-toluene sulphamide and polypropylene oxide.

7. Process according to claim 1 wherein the catalyst is selected from the group consisting of sodium and potassium.

8. Process according to claim 1 wherein the cocatalyst is soluble at the reaction temperature in the reaction mixture formed by the lactam and catalyst.

9. Process according to claim 1, wherein the linear polyamide is made by the polymerisation of $\omega$-caprylactam.

10. Process according to claim 1, wherein the linear polyamide is made by the polymerisation of $\epsilon$-caprolactam.

References Cited by the Examiner
UNITED STATES PATENTS

| | | | |
|---|---|---|---|
| 2,241,321 | 5/1941 | Schlack | 260—78 |
| 3,028,369 | 4/1962 | Butler et al. | 260—78 |

WILLIAM H. SHORT, *Primary Examiner.*

H. D. ANDERSON, *Assistant Examiner.*